（12）United States Patent
Houtchens

(10) Patent No.: US 6,343,616 B1
(45) Date of Patent: Feb. 5, 2002

(54) DRIP EMITTER ATTACHING APPARATUS

(76) Inventor: Charles R. Houtchens, 14618 W. Morning Star Trail, Surprise, AZ (US) 85374-3590

(*) Notice: Subject to any disclaimer, the term of this patent is extended or adjusted under 35 U.S.C. 154(b) by 0 days.

(21) Appl. No.: 09/737,790

(22) Filed: Dec. 15, 2000

(51) Int. Cl.[7] ............ F16K 43/00; B05B 1/20; B05B 15/00; F16L 41/04
(52) U.S. Cl. .......... 137/318; 222/83; 239/272; 239/542; 285/197
(58) Field of Search ............ 137/318; 222/83, 222/83.5, 88; 239/271, 272, 542, 600; 285/197; 30/92.5, 92

(56) References Cited

U.S. PATENT DOCUMENTS

| 3,252,475 A | * | 5/1966 | Jones ............ 137/318 |
| 3,395,724 A | * | 8/1968 | Hamel ........... 137/318 |
| 3,698,419 A | * | 10/1972 | Tura ............ 137/318 |
| 3,806,031 A | * | 4/1974 | Olson ........... 239/272 |
| 3,891,150 A | * | 6/1975 | Hoff et al. ..... 239/272 |
| 3,920,037 A | * | 11/1975 | Hoff et al. ..... 137/318 |
| 3,976,091 A | | 8/1976 | Hutton |
| 4,036,088 A | | 7/1977 | Ruskin |
| 4,112,944 A | * | 9/1978 | Williams ........ 137/318 |
| 4,121,771 A | * | 10/1978 | Hendrickson .... 239/272 |
| 4,218,953 A | | 8/1980 | Haytayan |
| 4,522,339 A | * | 6/1985 | Costa ........... 137/318 |
| 4,713,995 A | | 12/1987 | Davi |
| 5,247,863 A | | 9/1993 | Cohen |
| 5,291,914 A | * | 3/1994 | Bares et al. .... 137/15.13 |
| 5,301,532 A | * | 4/1994 | Bickmore et al. .. 137/318 |
| 5,373,866 A | * | 12/1994 | Whalen, II ...... 137/318 |
| 5,398,718 A | * | 3/1995 | Roinick, Sr. .... 137/318 |
| 5,694,972 A | * | 12/1997 | King ............ 137/318 |
| D396,245 S | | 7/1998 | Ng |
| 6,041,810 A | * | 3/2000 | Dudley .......... 137/318 |
| 6,053,362 A | * | 4/2000 | Lin ............. 137/318 |
| 6,216,723 B1 | * | 4/2000 | King ............ 137/318 |

* cited by examiner

Primary Examiner—George L. Walton

(57) ABSTRACT

A drip emitter attaching apparatus for easily attaching drip emitters to a tube. The drip emitter attaching apparatus includes a drip emitter attaching apparatus for puncturing holes in a piece of piping and attaching a 45 degree drip emitter, a straight drip emitter and a T-drip emitter to the pipe. The drip emitter attaching apparatus comprises a housing. The housing comprises a first block portion. The first block portion includes a first end, a second end, a bottom side, a top side with a peripheral edge extending therebetween. The top side includes a elongated arcuate depression therein and extending between the first end and the second end. The housing also comprises a second block portion. The second block portion includes a first end, a second end, a first lateral side wall, a second lateral side wall, a bottom surface, and a top surface. The top surface includes a elongated arcuate depression therein. The arcuate depression includes a well extending therein. The drip emitters are removably positioned in the well. A piercing means is removably positioned in the well. A hinging means is used in securably coupling the first block portion to the second block portion.

6 Claims, 3 Drawing Sheets

DRIP EMITTER ATTACHING APPARATUS

BACKGROUND OF THE INVENTION

1. Field of the Invention

The present invention relates to drip system connectors and more particularly pertains to a new drip emitter attaching apparatus for easily attaching drip emitters to a tube.

2. Description of the Prior Art

The use of drip system connectors is known in the prior art. More specifically, drip system connectors hereto devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,976,091; U.S. Pat. No. 4,036,088; U.S. Pat. No. 4,218,953; U.S. Pat. No. 4,713,995; U.S. Pat. No. 5,247,863; and U.S. Pat. No. Des. 396,245.

While these devices fulfill their respective, particular objectives and requirements, the aforementioned patents do not disclose a new drip emitter attaching apparatus. The inventive device includes a drip emitter attaching apparatus for puncturing holes in a piece of piping and attaching a 45 degree drip emitter, a straight drip emitter or a T-drip emitter to the pipe. The drip emitter attaching apparatus comprises a housing. The housing comprises a first block portion. The first block portion includes a first end, a second end, a bottom side, a top side with a peripheral edge extending therebetween. The top side includes a elongated arcuate depression therein and extending between the first end and the second end. The housing also comprises a second block portion. The second block portion includes a first end, a second end, a first lateral side wall, a second lateral side wall, a bottom surface, and a top surface. The top surface includes a elongated arcuate depression therein. The arcuate depression includes a well extending therein. The drip emitters are removably positioned in the well. A piercing means is removably positioned in the well. A hinging means is used in securably coupling the first block portion to the second block portion.

In these respects, the drip emitter attaching apparatus according to the present invention substantially departs from the conventional concepts and designs of the prior art, and in so doing provides an apparatus primarily developed for the purpose of easily attaching drip emitters to a tube.

SUMMARY OF THE INVENTION

In view of the foregoing disadvantages inherent in the known types of drip system connectors now present in the prior art, the present invention provides a new drip emitter attaching apparatus construction wherein the same can be utilized for easily attaching drip emitters to a tube.

The general purpose of the present invention, which will be described subsequently in greater detail, is to provide a new drip emitter attaching apparatus apparatus and method which has many of the advantages of the drip system connectors mentioned heretofore and many novel features that result in a new drip emitter attaching apparatus which is not anticipated, rendered obvious, suggested, or even implied by any of the prior art drip system connectors, either alone or in any combination thereof.

To attain this, the present invention generally comprises a drip emitter attaching apparatus for puncturing holes in a piece of piping and attaching a 45 degree drip emitter, a straight drip emitter or a T-drip emitter to the pipe. The drip emitter attaching apparatus comprises a housing. The housing comprises a first block portion. The first block portion includes a first end, a second end, a bottom side, a top side with a peripheral edge extending therebetween. The top side includes a elongated arcuate depression therein and extending between the first end and the second end. The housing also comprises a second block portion. The second block portion includes a first end, a second end, a first lateral side wall, a second lateral side wall, a bottom surface, and a top surface. The top surface includes a elongated arcuate depression therein. The arcuate depression includes a well extending therein. The drip emitters are removably positioned in the well. A piercing means is removably positioned in the well. A hinging means is used in securably coupling the first block portion to the second block portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new drip emitter attaching apparatus apparatus and method which has many of the advantages of the drip system connectors mentioned heretofore and many novel features that result in a new drip emitter attaching apparatus which is not anticipated, rendered obvious, suggested, or even implied by any of the prior art drip system connectors, either alone or in any combination thereof.

It is another object of the present invention to provide a new drip emitter attaching apparatus which may be easily and efficiently manufactured and marketed.

It is a further object of the present invention to provide a news drip emitter attaching apparatus which is of durable and reliable construction.

An even further object of the present invention is to provide a new drip emitter attaching apparatus which is susceptible of a low cost of manufacture with regard to both materials and labor, and which accordingly is then susceptible of low prices of sale to the consuming public, thereby making such drip emitter attaching apparatus economically available to the buying public.

Still yet another object of the present invention is to provide a new drip emitter attaching apparatus which provides in the apparatuses and methods of the prior art some of the advantages thereof, while simultaneously overcoming some of the disadvantages normally associated therewith.

Still another object of the present invention is to provide a new drip emitter attaching apparatus for easily attaching drip emitters to a tube.

Yet another object of the present invention is to provide a new drip emitter attaching apparatus which includes a drip emitter attaching apparatus for puncturing holes in a piece of piping and attaching a 45 degree drip emitter, a straight drip emitter or a T-drip emitter to the pipe. The drip emitter attaching apparatus comprises a housing. The housing comprises a first block portion. The first block portion includes a first end, a second end, a bottom side, a top side with a peripheral edge extending therebetween. The top side includes a elongated arcuate depression therein and extending between the first end and the second end. The housing also comprises a second block portion. The second block portion includes a first end, a second end, a first lateral side wall, a second lateral side wall, a bottom surface, and a top surface. The top surface includes a elongated arcuate depression therein. The arcuate depression includes a well extending therein. The drip emitters are removably positioned in the well. A piercing means is removably positioned in the well. A hinging means is used in securably coupling the first block portion to the second block portion.

Still yet another object of the present invention is to provide a new drip emitter attaching apparatus that easily creates the appropriate size holes for the drip emitters that aids in reducing the possibility of leaks from the drip emitters.

Even still another object of the present invention is to provide a new drip emitter attaching apparatus that may use a wide variety of drip emitters providing users with more versatility in assembling their drip systems.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
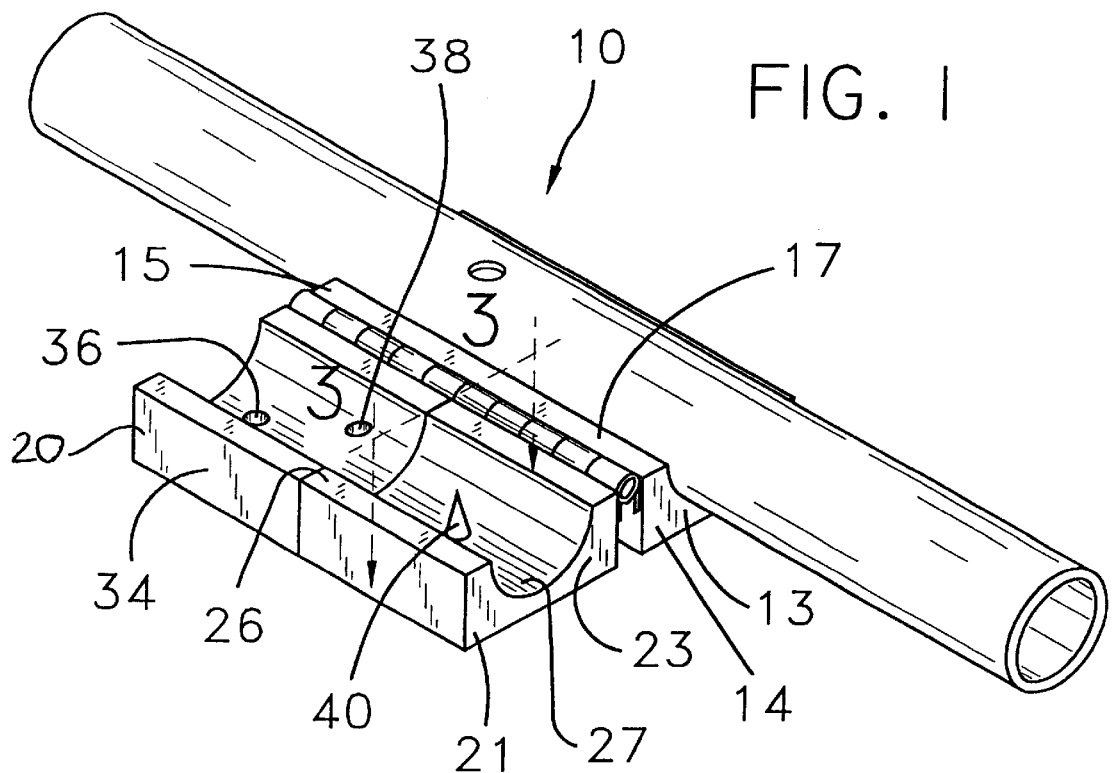
FIG. 1 is a schematic perspective view of a new drip emitter attaching apparatus according to the present invention.
Figure 2:
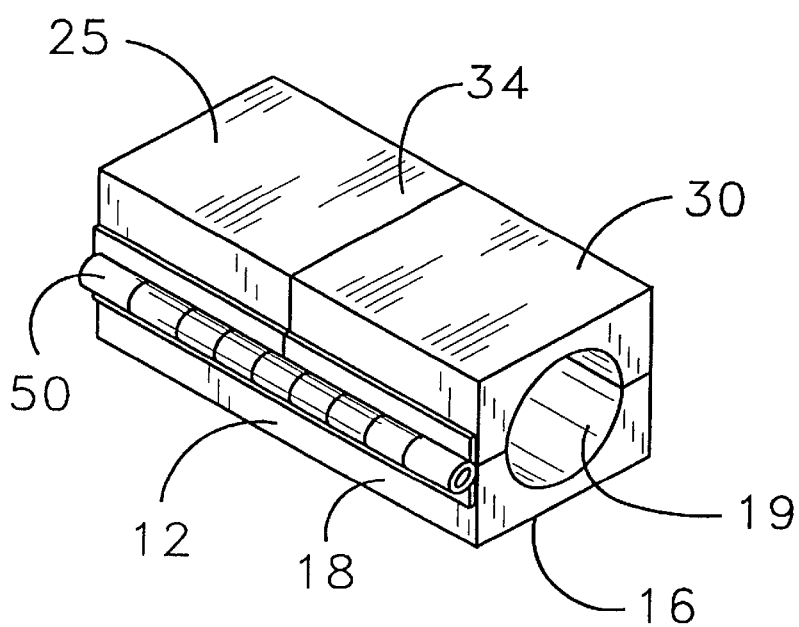
FIG. 2 is a schematic perspective view of the present invention showing it in its closed position.
Figure 3:
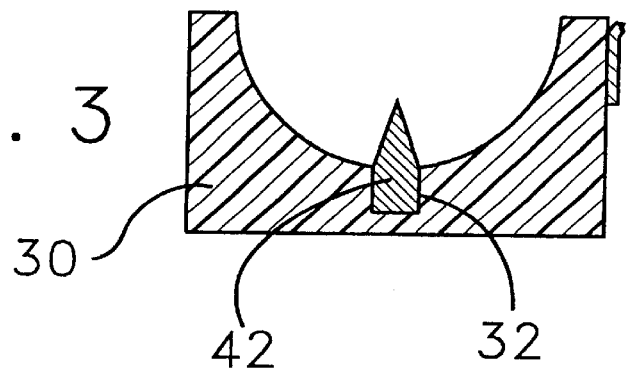
FIG. 3 is a schematic is a cross-section view of the present invention taken along lines 3—3.
Figure 4:
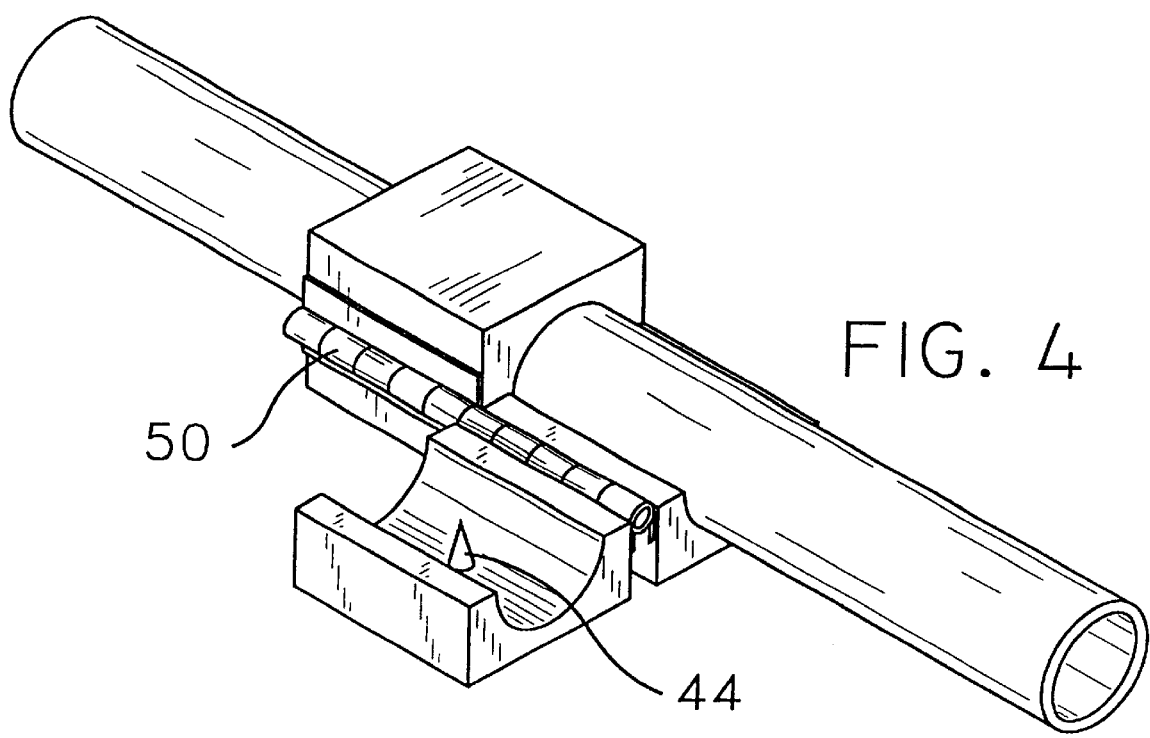
FIG. 4 is a schematic is a cross-section view of the present invention taken along lines 3—3.
Figure 5:
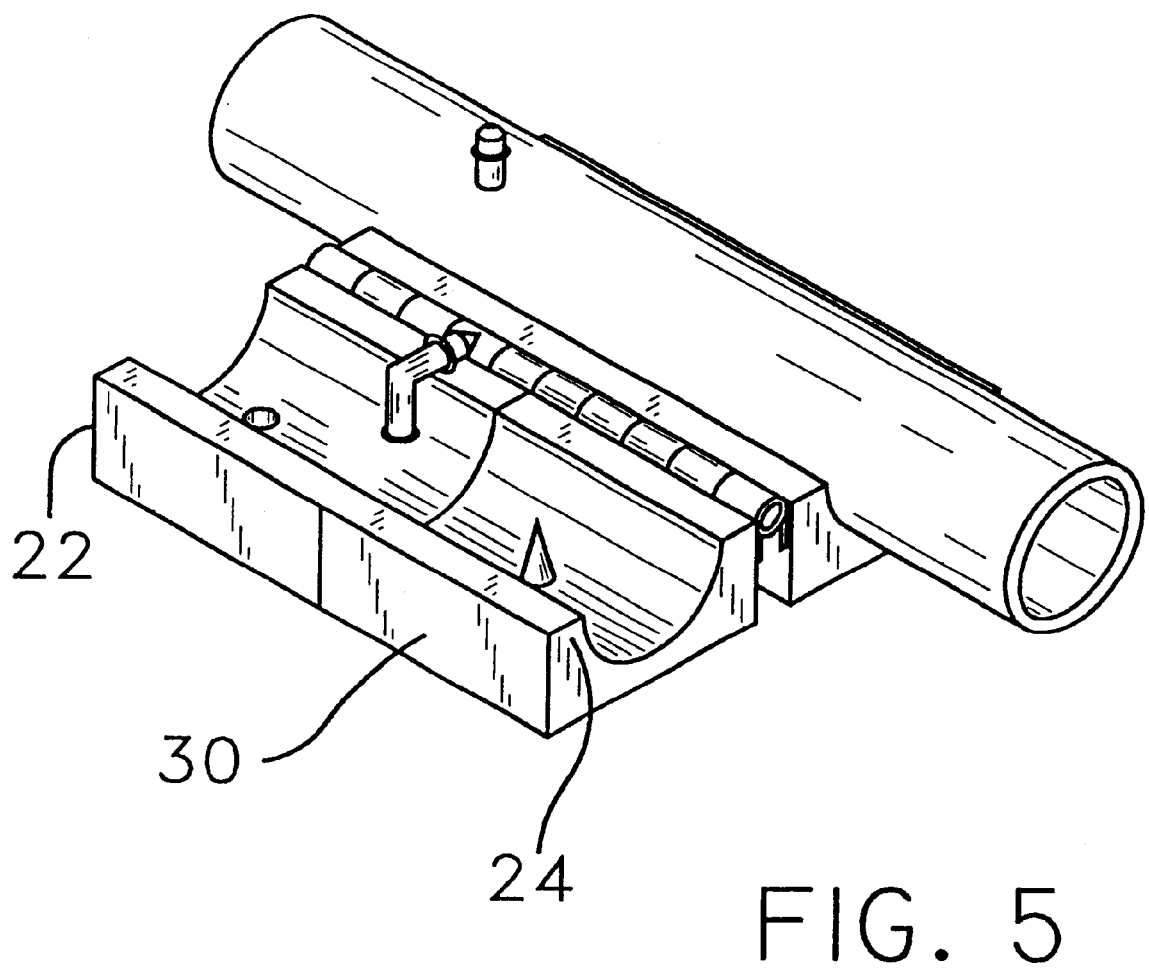
FIG. 5 is a schematic is a cross-section view of the present invention showing the 45 degree drip emitter placement.

With reference now to the drawings, and in particular to FIGS. 1 through 5 thereof, a new drip emitter attaching apparatus embodying the principles and concepts of the present invention and generally designated by the reference numeral 10 will be described.

As best illustrated in FIGS. 1 through 5, the drip emitter attaching apparatus for puncturing holes in a piece of piping and attaching a 45 degree drip emitter, a straight drip emitter or a T-drip emitter to the pipe. The drip emitter attaching apparatus 10 comprises a housing 12. The housing 12 comprises a first block portion 13. The first block portion 13 includes a first end 14, a second end 15, a bottom side 16, a top side 17 with a peripheral edge extending therebetween 18. The top side 17 includes a elongated arcuate depression 19 therein and extending between the first end 14 and the second end 15 such that a cross section of the arcuate depression 19 taken transversely to a longitudinal axis extending through the ends 15 and 16 generally has a hemi-circular shape. Thereby, generally giving the first block portion 13 a U-shape. In an embodiment the pipe may be positioned in the elongated arcuate depression 19 with the pipe extending through the first and second ends 15 and 16.

The housing 12 also includes a second block portion 20. The second block portion 20 includes a first end 21, a second end 22, a bottom surface 25, a top surface 26, a first lateral side wall 23 and a second lateral side wall 24. The top surface 26 includes a elongated arcuate depression 27 therein and extending between the first end 21 of the second block portion 20 and the second end 22 of the second block portion 20 such that a cross section of the arcuate depression 27 taken transversely to a longitudinal axis extending through the ends 21 and 22 of the second block portion 20 generally has a hemi-circular shape. Thus, generally giving the second block portion 20 a U-shape. The second block portion 20 is divided along a plane orientated generally perpendicular to the longitudinal axis of the elongated arcuate depression 27 such that a first half 30 and a second half 34 of the second block portion 20 are defined.

The arcuate depression 27 of the first half 30 includes a well 32 extending therein. The well 32 is positioned in a central portion of the first half 30. The well 32 is positioned between the division and the first and second lateral walls 23 and 24.

The arcuate depression 27 of the second half 34 includes a first bore 36 and a second bore 38 extending therein. The first bore 36 is orientated generally adjacent to the first end 21 and nearer the second lateral side wall 24 respective to the first lateral side wall 23 of the second block portion 20. The second bore 38 is positioned generally nearer the first lateral side wall 23 respective to the second lateral side wall 24.

The placement of the first and second bores 36 and 38 allows for proper positioning of the drip emitters into the piece of pipe. In an embodiment the straight drip emitter is removably positioned in the first bore 36 and the 45 degree drip emitter and the T-drip emitter are removably positioned in the second bore 38.

The housing 12 also includes a piercing means 40. The piercing means 40 is positioned in and extending outwardly from With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A drip emitter attaching apparatus for puncturing holes in a pipe and attaching a 45 degree drip emitter, a straight drip emitter or a T-drip emitter to the pipe, said drip emitter attaching apparatus comprising:
   a housing for slidably clamping about a pipe, said housing comprising:
      a first block portion having a first end, a second end, a bottom side, a top side with a peripheral edge extending therebetween, said top side having a elongated arcuate depression formed therein extending between said first end and said second end for receiving the pipe;
      a second block portion having a first end, a second end, a first lateral side wall, a second lateral side wall, a bottom surface, and a top surface, said top surface having an elongated arcuate depression therein, said arcuate depression having a well extending therein, said second block portion having a bore for removably receiving a drip emitter;
   a piercing means for piercing a hole into the pipe, said piercing means being removably positioned in said well such that clamping said housing on the pipe pierces the pipe; and
   a hinging means for coupling said first block to said second block;
   wherein the pipe is adapted to be slidably received in said housing for permitting alignment of a hole pierced in the pipe by said piercing means upon sliding of said housing with respect to the pipe.

2. The drip emitter attaching apparatus of claim 1, wherein said second block portion is divided along a plane orientated generally perpendicular to a longitudinal axis of said elongated arcuate depression extending between said first and second ends of said second block portion, said second block portion having a first half with said at least one well formed therein and a second half having a first said bore and a second bore formed therein.

3. The drip emitter attaching apparatus of claim 1, wherein said piercing means is positioned in and extending outwardly from said well and securably coupled to said second block portion, said piercing means having a diameter generally corresponding to a diameter of said drip emitter, said piercing means generally comprising a rod having a conical tip extending outwardly from said well for puncturing a hole in said pipe.

4. The drip emitter attaching apparatus of claim 2, wherein said piercing means is positioned in and extending outwardly from said well and securably coupled to said second block portion, said piercing means having a diameter generally corresponding to a diameter of said drip emitter, said piercing means generally comprising a rod having a conical tip extending outwardly from said well for puncturing a hole in said pipe.

5. The drip emitter attaching apparatus of claim 1, wherein said hinging means hingedly couples said peripheral edge of said first block portion to said first lateral side wall of said second block portion such that said top side of said first block portion may be selectively abutted against said top surface of said second block portion.

6. A drip emitter attaching apparatus for puncturing holes in a pipe and attaching a 45 degree drip emitter, a straight drip emitter or a T-drip emitter to the pipe, said drip emitter attaching apparatus comprising:
   a housing for slidably clamping about a pipe, said housing comprising:
      a first block portion having a first end, a second end, a bottom side, a top side with a peripheral edge extending therebetween, said top side having a elongated arcuate depression formed therein extending between said first end and said second end such that a cross section of said arcuate depression taken tranversely to a longitudinal axis extending through said ends generally has a hemi-circular shape, wherein said pipe may be positioned in said elongated arcuate depression, said pipe extending through said first and second ends;
      a second block portion having a first end, a bottom surface, a top surface a second end and a first lateral side wall, a second lateral side wall, said top surface having an elongated arcuate depression therein and extending between said first end of said second block portion and said second end of said second block portion such that a cross section of said arcuate depression taken transversely to a longitudinal axis extending through said ends of said second block portion generally has a hemi-circular shape, said second block portion being divided along a plane oriented generally perpendicular to said longitudinal axis of said elongated arcuate depression such that a first half and a second half of said second block portion are defined;
         said arcuate depression of said first half having a well extending therein, said well being positioned in a central portion of said first half;
         said arcuate depression of said second half having a first bore and a second bore extending therein, said first bore being orientated generally adjacent to said first end and nearer said second lateral side wall respective to said first lateral side wall of said second block portion, said second bore being positioned generally nearer said first lateral side wall respective to said second lateral side wall;
   wherein said straight drip emitter being removably positioned in said first bore and wherein said 45 degree drip emitter and said T-drip emitter being removably positioned in said second bore;
      a piercing means for piercing a hole into the pipe, said piercing means being positioned and extending outwardly from said well and securably coupled to said first half portion, said piercing means having a diameter generally corresponding to a diameter of said drip emitter, said piercing means generally comprising a rod having a conical tip extending outwardly from said well, wherein clamping of said housing on the pipe presses said piercing means against the pipe to puncture a hole in the pipe; and
      a hinging means for coupling said peripheral edge of said first block portion to said first lateral side wall of said second block portion such that said top side of said first block portion is selectively abuttable against said top surface of said second block portion;

wherein the pipe is adapted to be slidably received in said housing for permitting alignment of a hole pierced in the pipe by said piercing means upon sliding of said housing with respect to the pipe.

\* \* \* \* \*